US008783554B2

(12) United States Patent
Iizaka

(10) Patent No.: US 8,783,554 B2
(45) Date of Patent: Jul. 22, 2014

(54) INFORMATION READING APPARATUS, COMMODITY SALES INFORMATION PROCESSING APPARATUS, AND PASTED OBJECT

(75) Inventor: Hitoshi Iizaka, Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 60 days.

(21) Appl. No.: 13/217,835

(22) Filed: Aug. 25, 2011

(65) Prior Publication Data

US 2012/0048920 A1 Mar. 1, 2012

(30) Foreign Application Priority Data

Aug. 31, 2010 (JP) ................................ 2010-194368
Aug. 5, 2011 (JP) ................................ 2011-172102

(51) Int. Cl.
*G06F 17/00* (2006.01)

(52) U.S. Cl.
USPC .......................................................... 235/375

(58) Field of Classification Search
USPC .......... 235/462.08–462.11, 462.41, 454, 375, 235/385, 383; 705/22, 28; 382/182, 183, 382/190
See application file for complete search history.

(56) References Cited

U.S. PATENT DOCUMENTS

| | | | | |
|---|---|---|---|---|
| 5,770,841 A * | 6/1998 | Moed et al. | 235/375 |
| 6,360,001 B1 * | 3/2002 | Berger et al. | 382/101 |
| 6,466,340 B1 * | 10/2002 | Washio | 358/488 |
| 7,458,612 B1 * | 12/2008 | Bennett | 283/81 |
| 2005/0248148 A1 * | 11/2005 | Schenck et al. | 283/74 |
| 2005/0278263 A1 * | 12/2005 | Hollander et al. | 705/402 |
| 2006/0195364 A1 * | 8/2006 | Shroff et al. | 705/26 |
| 2011/0180596 A1 * | 7/2011 | Iizaka et al. | 235/375 |
| 2012/0055994 A1 * | 3/2012 | Yanagi | 235/454 |

FOREIGN PATENT DOCUMENTS

| | | |
|---|---|---|
| JP | 2002-366884 A | 12/2002 |
| JP | 2008-033640 | 2/2008 |

OTHER PUBLICATIONS

Decision of a Patent Grant mailed Mar. 26, 2013 for Japanese Patent Application 2011-172102, 3 pages.

* cited by examiner

*Primary Examiner* — Michael G Lee
*Assistant Examiner* — Suezu Ellis
(74) *Attorney, Agent, or Firm* — Amin, Turocy & Watson, LLP

(57) ABSTRACT

According to one embodiment, an information reading apparatus includes a first image-data specifying section, a second image-data specifying section, a correspondence determining section, an information-code specifying section, and an information specifying section. The first image-data specifying section specifies, from photographed image data, first image data corresponding to an information code given to a commodity. The second image-data specifying section specifies, from the photographed image data, second image data corresponding to a pasted object pasted to the commodity. The correspondence determining section determines that the first image data and the second image data correspond to each other when the first image data is located, with respect to the second image data, in a direction specified on the basis of the second image data. The information-code specifying section specifies the information code from the first image data. The information specifying section specifies information from the second image data.

11 Claims, 8 Drawing Sheets

INFORMATION READING APPARATUS, COMMODITY SALES INFORMATION PROCESSING APPARATUS, AND PASTED OBJECT

CROSS-REFERENCE TO RELATED APPLICATIONS

This application is based upon and claims the benefit of priority from the prior Japanese Patent Applications No. 2010-194368, filed on Aug. 31, 2010 and No. 2011-172102, filed on Aug. 5, 2011; the entire contents of all of which are incorporated herein by reference.

FILED

Embodiments described herein relate generally to an information reading apparatus, a commodity sales information processing apparatus, and a pasted object.

BACKGROUND

In the past, an information reading apparatus is known that reads, from photographed image data, an information code given to a commodity and information such as price-cut information. In the information reading apparatus of this type, it is desired to more accurately grasp the association between the information code and the information.

DETAILED DESCRIPTION

In general, according to one embodiment, an information reading apparatus includes a first image-data specifying section, a second image-data specifying section, a correspondence determining section, an information-code specifying section, and an additional-information specifying section. The first image-data specifying section specifies, from photographed image data, first image data corresponding to an information code given to a commodity. The second image-data specifying section specifies, from the photographed image data, second image data corresponding to a pasted object pasted to the commodity. The correspondence determining section determines that the first image data and the second image data correspond to each other when the first image data is located, with respect to the second image data, in a direction specified on the basis of the second image data. The information-code specifying section specifies the information code from the first image data. The information specifying section specifies additional information from the second image data.

Various Embodiments will be described hereinafter with reference to the accompanying drawings.

Figure 1:
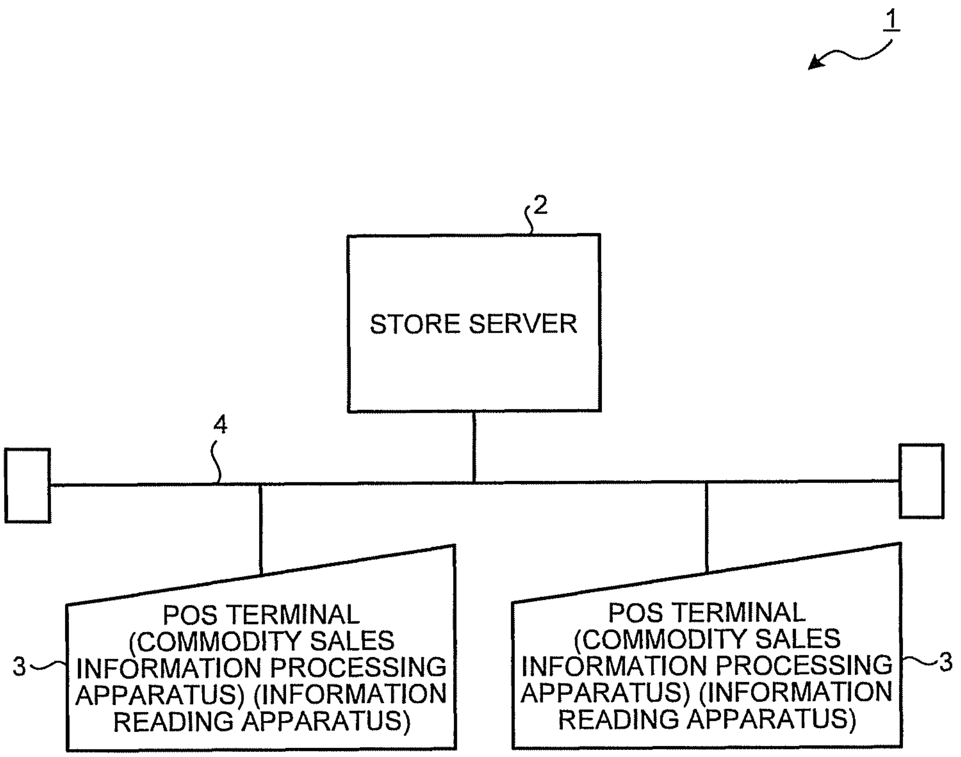
FIG. 1 is a diagram showing an example of a schematic configuration of a commodity sales information processing system including an information reading apparatus according to an embodiment.

As shown in FIG. 1, in an embodiment, a commodity sales information processing system 1 is configured as a store system and includes a store server 2 and a POS (Point Of Sales) terminal 3. The store server 2 and the POS terminal 3 are electrically connected via a telecommunication line 4 such as a LAN (Local Area Network).

Figure 2:
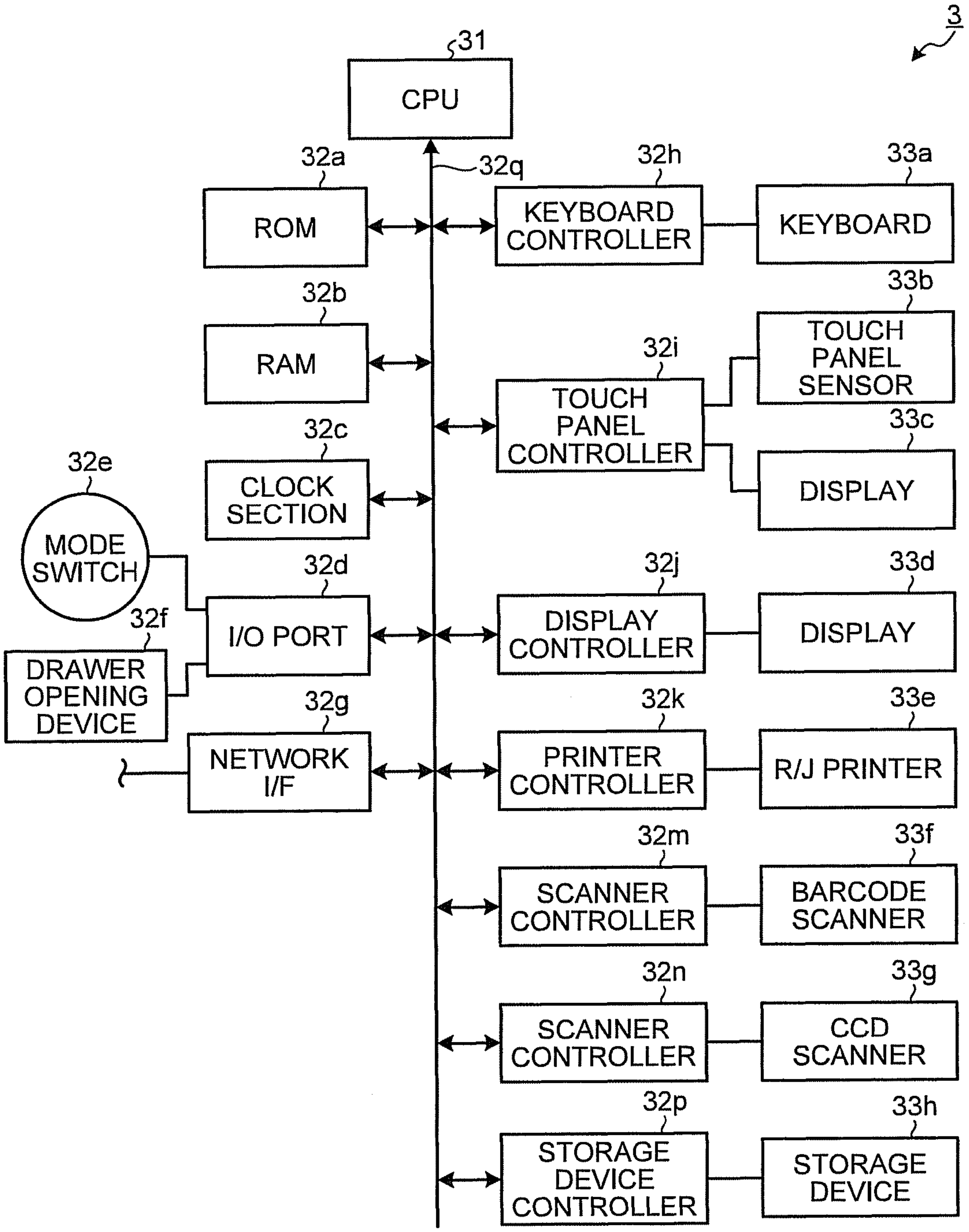
FIG. 2 is a block diagram of an example of a POS terminal functioning as the information reading apparatus.

As shown in FIG. 2, the POS terminal 3 includes a CPU (Central Processing Unit) 31, a ROM (Read Only Memory) 32*a*, a RAM (Random Access Memory) 32*b*, a clock section 32*c*, an I/O (Input/Output) port 32*d*, a network interface 32*g*, a keyboard controller 32*h*, a touch panel controller 32*i*, a display controller 32*j*, a printer controller 32*k*, scanner controllers 32*m* and 32*n*, and a storage device controller 32*p*. As shown in FIG. 2, these components are connected to one another via a bus line 32*q* such as an address bus or a data bus.

The CPU 31 controls the POS terminal 3 by executing computer-readable various computer programs stored in the ROM 32*a* or the like. The ROM 32*a* stores therein various data, various computer programs (a BIOS program, an application program, a device driver program, etc.), and the like to be executed by the CPU 31. When the CPU 31 executes the various computer programs, the RAM 32*b* temporarily stores the data and the computer programs.

Figure 3:
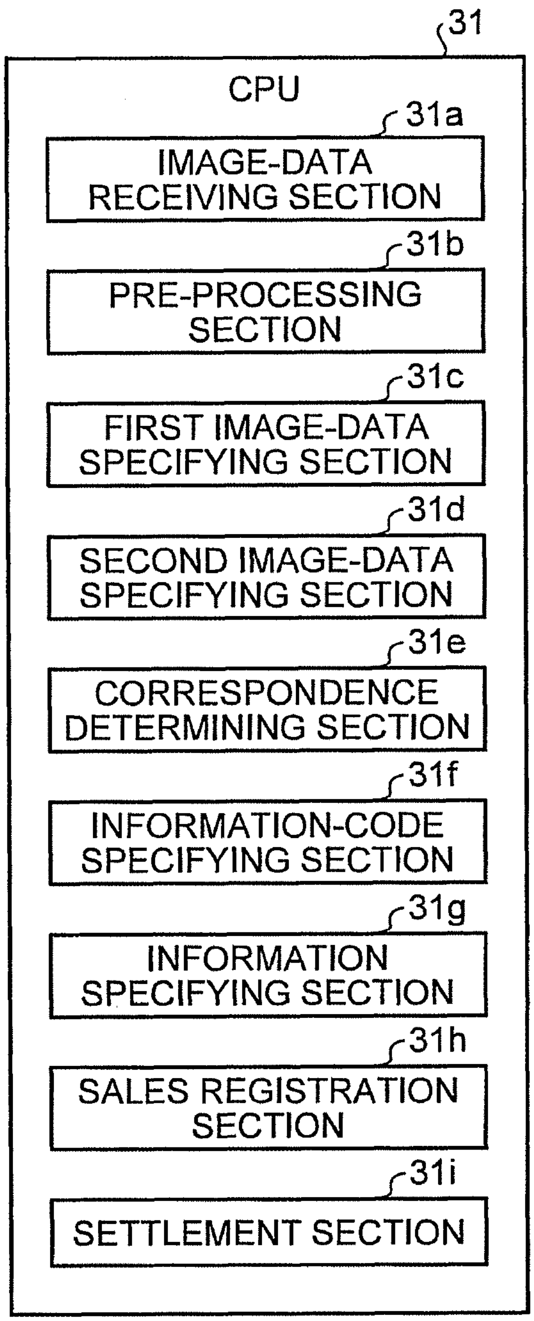
FIG. 3 is a block diagram of an example of a CPU of the POS terminal.

In this embodiment, the computer programs for the POS terminal 3 include a module for receiving image data photographed by an image pickup section such as a barcode scanner 33*f* and a CCD scanner 33*g*, a module for pre-processing, a module for specifying, from the photographed image data, first image data corresponding to an information code, a module for specifying, from the photographed image data, second image data corresponding to a pasted object, a module for determining whether the specified first and second image data correspond to each other, a module for reading the information code, a module for reading additional information displayed on the pasted object, a module for performing sales registration, and a module for performing settlement. Therefore, the CPU 31 of the POS terminal 3 operates as, according to the computer programs, as shown in FIG. 3, an image-data receiving section 31*a*, a pre-processing section 31*b*, a first image-data specifying section 31*c*, a second image-data specifying section 31*d*, a correspondence determining section 31*e*, an information-code specifying section 31*f*, an additional-information specifying section 31*g*, a sales registration section 31*h*, a settlement section 31*i*, and the like.

The clock section 32*c* measures the present date and time. The I/O port 32*d* receives the input of a mode selection signal from a mode switch 32*e* and outputs a signal to a drawer opening device 32*f* configured to automatically open a drawer (not shown). The network interface (I/F) 32*g* controls data communication with another apparatus connected through the telecommunication line 4 or the like. The keyboard controller 32*h* receives a key signal corresponding to an operation key from a keyboard 33*a* and sends the key signal to the CPU 31. The touch panel controller 32*i* controls a customer display 33*c* to display an image or the like corresponding to data received from the CPU 31. The touch panel controller 32*i* receives a signal from a touch panel sensor 33*b* provided in the display 33*c* and sends the signal to the CPU 31. The display controller 32*j* controls an operator display 33*d* to display an image or the like corresponding to data received from the CPU 31. The printer controller 32*k* controls a receipt and journal (R/J) printer 33*e* to perform receipt printing and journal printing on the basis of data supplied from the CPU 31. The scanner controllers 32*m* and 32*n* receive a signal of data read by the barcode scanner 33*f* or the CCD scanner 33*g* and send the signal to the CPU 31. The barcode scanner 33*f* and the CCD scanner 33*g* are examples of an image pickup section (an image pickup element or image pickup means).

The storage device controller 32*p* controls, on the basis of an instruction signal from the CPU 31, writing and readout of data in and from a storage device 33*h* functioning as a non-volatile storing section. The storage device 33*h* stores various data besides an OS (Operating System) program, an application program, a device driver program, and the like.

Figure 4:
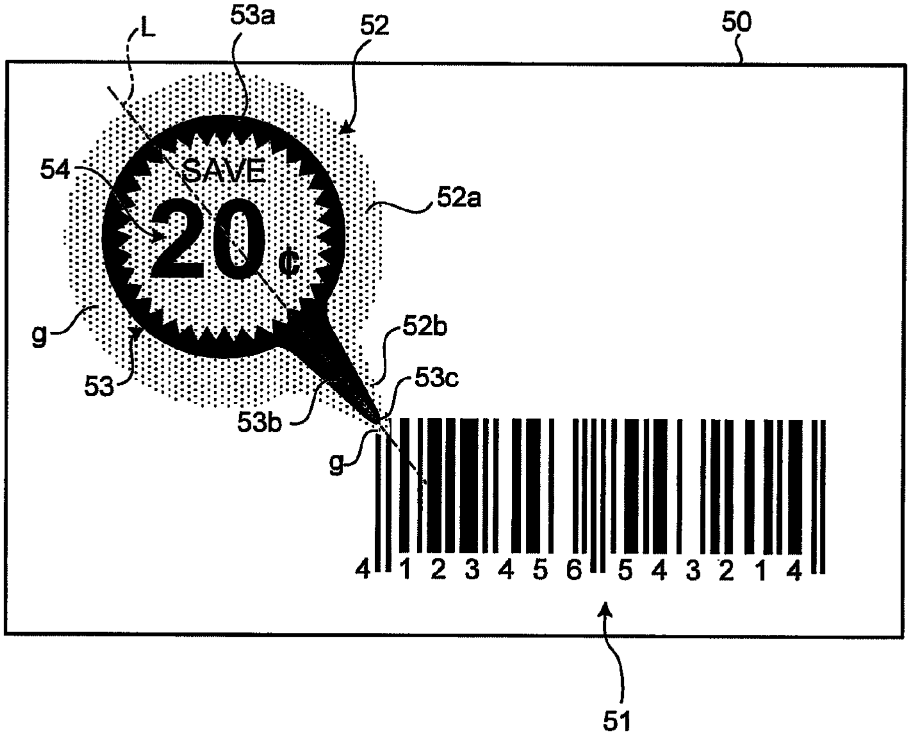
FIG. 4 is a schematic diagram of an example of a commodity given with an information code and additional information read by the information reading apparatus.
Figure 5:
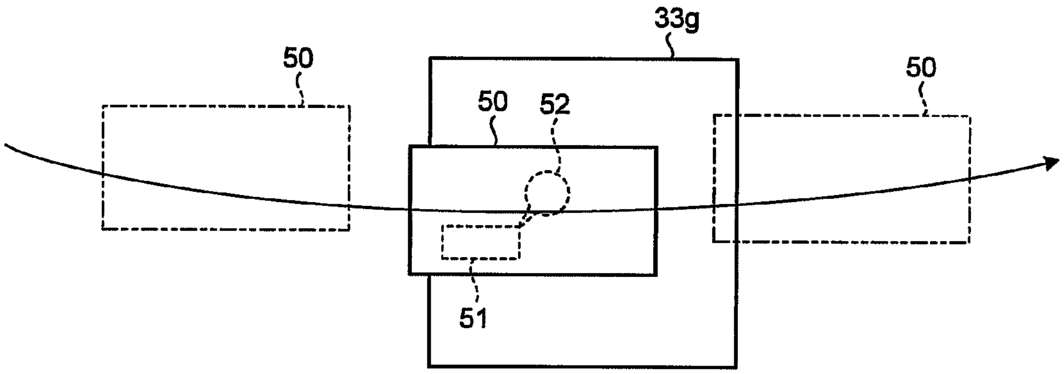
FIG. 5 is a conceptual diagram for explaining how a commodity moves when the information code and the additional information are read by a scanner of the information reading apparatus.

For example, the CCD scanner 33*g* reads an information code 51 (e.g., a one-dimensional code) and a pasted object 52 given to a commodity 50 as shown in FIG. 4. In an example shown in FIG. 5, the CCD scanner 33*g* reads the information code 51 and the pasted object 52 of the commodity 50 that an operator causes to pass, for example, from the left side to the right side in FIG. 5 on the operator's side of the CCD scanner 33*g* (the front side on the paper surface of FIG. 5).

The pasted object 52 is pasted to the surface of the commodity 50 with an adhesive or the like applied to the rear surface of a sheet such as a base sheet. Specifically, the pasted object 52 is a price-cut seal, a point seal, or the like. As shown in FIG. 4, for example, the pasted object 52 includes additional information 54 and an image 53.

The additional information 54 is information concerning, for example, the commodity 50 and a benefit offered by a store or a manufacturer. Further, the additional information 54 is information added when the pasted object 52 is pasted to the commodity 50. The additional information 54 can be, for example, characters, a number, an image, or an information code. It is desirable that an operator, a store clerk, a customer, and the like can visually understand the additional information 54. The additional information 54 can indicate that, for example, the commodity 50 is a price-cut target or a point grant target and can indicate a price-cut amount, a value of a point, or the like.

The image 53 is an image different from the additional information 54. As an example, the image 53 can have a function of making it easy to specify the association between the pasted object 52 (the additional information 54) and the information code 51 through image processing. As an example, the image 53 can also have a function of making the pasted object 52 visually conspicuous. In this embodiment, as an example, the image 53 includes a surrounding portion 53*a* and an extending portion 53*b*. The surrounding portion 53*a* surrounds the additional information 54. The surrounding portion 53*a* can be formed in, for example, a ring shape (an annular shape or a rectangular ring shape). Cutouts can be provided in one or more places in the surrounding portion 53*a*. The surrounding portion 53*a* can be a line such as a dotted line or a broken line. In this embodiment, as an example, the inner edge of the surrounding portion 53*a* is formed in a saw teeth shape.

The extending portion 53*b* extends along one direction. In this embodiment, as an example, the extending portion 53*b* is a protrusion projecting in a triangular shape in one direction from the surrounding portion 53*a*. In this embodiment, the width of the extending portion 53*b* decreases with distance from the surrounding portion 53*a*. The extending portion 53*b* includes a pointed end 53*c*.

The image 53 is formed line-symmetrically with respect to a straight line L serving as the center line of the extending portion 53*b*. The straight line L can pass the center of the image 53 and the pasted object 52. The image 53 (in particular, the extending portion 53*b*) is an example of a direction presenting image indicating a direction in which the information code 51 related to the pasted object 52 is present with respect to the pasted object 52.

The pasted object 52 includes a base portion 52*a* and a projecting portion 52*b*. The base portion 52*a* includes the additional information 54 concerning the commodity 50 and the surrounding portion 53*a*. The projecting portion 52*b* projects from the base portion 52*a*. The extending portion 53*b* of the image 53 is displayed in the projecting portion 52*b*. Therefore, the operator (the store clerk, the customer, etc.) can easily paste the pasted object 52 in a state in which the operator can easily visually determine the association with the information code 51 (a direction in which the information code 51 corresponding to the pasted object 52 is present). The CPU 31 can easily determine, on data subjected to image processing, the association between the information code 51 and the image 53 and additional information 54.

For example, the image 53 and the additional information 54 are printed in colors and densities to which the contrast to the background is remarkable. For example, the image 53 and the additional information 54 are arranged not to overlap each other (to form a gap between the image 53 and the additional information 54). A color of the background of the pasted object 52, a color of the image 53, and a color of characters of the additional information 54 can be respectively different colors. Specifically, for example, the color of the background of the pasted object 52 can be yellow, the color of the image 53 can be red, and the color of the characters of the additional information 54 can be blue.

A margin area g is provided between the outer edge of the extending portion 53*b* of the image 53 and the outer edge of the extending portion 53*b* of the pasted object 52. Consequently, there is an advantage that, even if the pasted object 52 and the information code 51 overlap each other as shown in FIG. 4, the image 53 and an image of the information code 51 can be separately recognized in image processing.

Figure 6:
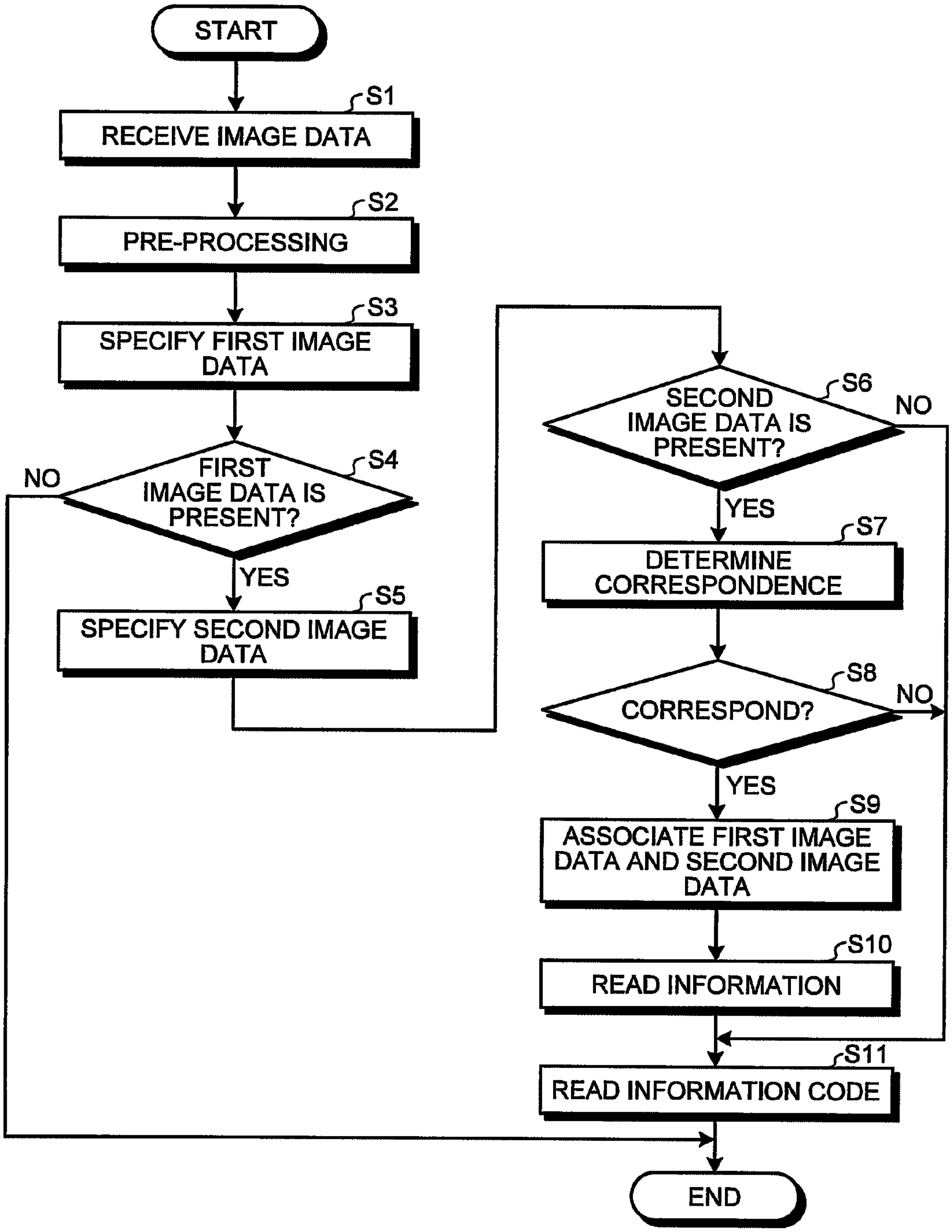
FIG. 6 is a flowchart for explaining an example of arithmetic processing related to the reading of the information code and the additional information by the information reading apparatus.

An example of arithmetic processing related to reading of the information code 51, the image 53, and the additional information 54 in the POS terminal 3 according to this embodiment is explained with reference to FIG. 6. FIG. 6 is a flowchart at timing when pixel information of an image pickup area of the CCD scanner 33*g* functioning as the image pickup section is acquired by the CCD scanner 33*g*.

First, the CPU 31 of the POS terminal 3 operates as the image-data receiving section 31*a*, controls the CCD scanner 33*g* functioning as the image pickup section, and receives, for example, image data (luminance value data) of all pixels in the image pickup area of the CCD scanner 33*g* (step S1).

Subsequently, the CPU 31 operates as the pre-processing section 31*b* and applies predetermined image processing (pre-processing for specifying a predetermined image in the next step S3) to the image data (step S2). The pre-processing in step S2 includes, for example, binarization, filtering, padding (closing), grouping (grouping pixels or pixel blocks adjacent or close to one another having the same binarized value (e.g., "0" or "1") into the same group), and labeling (giving labels (e.g., serial numbers) to groups).

Processing in steps S2 to S7 can be executed on, for example, pixel blocks (not shown) of a single shape (e.g., a square shape) arrayed in a lattice shape as an aggregate of plural pixels adjacent to one another. In that case, the CPU 31 operating as the first image-data specifying section 31*c* can calculate, in step S2, a total value, an average value, and the like (block data corresponding to the pixel blocks) of luminance values of the plural pixels included in the pixel blocks prior to the pre-processing and apply the image processing to the block data. Consequently, compared with the image processing performed in a pixel unit, it is possible to reduce a load of an arithmetic operation of the CPU 31 of the POS terminal 3.

Figure 7:
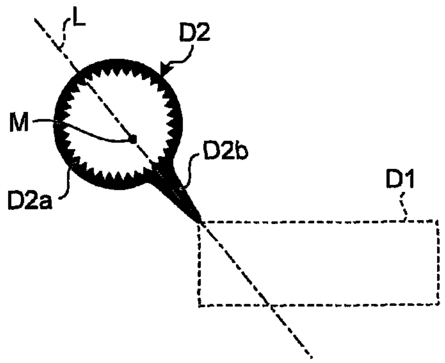
FIG. 7 is a diagram for explaining an example of determination concerning correspondence between the information code and the additional information by the information reading apparatus, wherein it is determined that the information code and the additional information correspond to each other.

The CPU 31 operating as the first image-data specifying section 31*c* checks presence or absence of image data (first image data) that satisfies a predetermined condition corresponding to the information code 51 (step S3). In step S3, the first image-data specifying section 31*c* checks presence or absence of image data corresponding to the information code (in the example shown in FIG. 5, a one-dimensional code) 51, for example, image data corresponding to the shape of a part or all of the information code 51. Specifically, for example, if the image processing is executed on relatively large pixel blocks, as shown in FIG. 7, first image data (a group of pixels or pixel blocks grouped into the same group) D1 corresponding to the information code 51 has a rectangular shape having blurred plural bars of the information code 51 serving as the one-dimensional code. Therefore, the first image-data specifying section 31*c* can specify (detect or extract) the first image data D1 corresponding to the overall rectangular shape of the information code 51. Alternatively, for example, if the image processing is executed on relatively small pixel blocks or pixels themselves, the first image-data specifying section 31*c* can also specify (detect or extract) characteristic one or plural bars included in the information code 51 serving as the one-dimensional code.

If the first image data D1 is not specified in step S3 (No in step S4), the CPU 31 ends the arithmetic processing at this timing.

On the other hand, if the first image data D1 is specified in step S4 (if the first image data D1 matching the condition is present in the processing in step S3; Yes in step S4), the CPU 31 operates as the second image-data specifying section 31*d* and checks presence or absence of image data (second image data) that satisfies a predetermined condition corresponding to the pasted object 52 (step S5). In step S5, the second image-data specifying section 31*d* checks presence or absence of image data corresponding to the pasted object 52, for example, second image data corresponding to the shape of a part or all of the image 53. Specifically, for example, second image data D2 corresponding to the image 53 has a shape including an annular portion D2*a* corresponding to the surrounding portion 53*a* and a protrusion-shaped portion D2*b* corresponding to the extending portion 53*b* projecting from the annular portion D2*a* in a radially outward direction, as shown in FIG. 7. Therefore, the second image-data specifying section 31*d* can specify the second image data D2 having the shape. The second image-data specifying section 31*d* can specify (detect or extract) the second image data D2 by checking, as an example, a degree of coincidence (a rate of coincidence, a rate of non-coincidence, etc.) with a pattern shape stored in the storage device 33*h* in advance.

If the second image data D2 is specified in step S5 (Yes in step S6), the CPU 31 operates as the correspondence determining section 31*e* and determines whether the first image data D1 and the second image data D2 correspond to each other, i.e., whether the image code 51 corresponding to the first image data D1 and the image 53 corresponding to the second image data D2 correspond to each other (step S7).

In step S7, the correspondence determining section 31*e* can calculate, as an example, on a two-dimensional coordinate (an orthogonal coordinate plane corresponding to the image pickup area) in which pixels of the image pickup area by the CCD scanner 33*g* functioning as the image pickup section are two-dimensionally arranged, concerning data of the pixels included in the second image data D2 corresponding to the image 53 (e.g., among binarized data of "0" or "1" of the pixels, data of "1" corresponding to the image), a straight line L on which a total of distances on the coordinate from the pixels included in the second image data D2 using a regression analysis (e.g., least square approximation) and detect a direction indicated by the image 53 (in particular, the extending portion 53*b* serving as the direction presenting image). Specifically, if the first image data D1 (e.g., a part thereof) is present on the straight line L or within a predetermined distance from the straight line L, the correspondence determining section 31*e* can determine that the first image data D1 and the second image data D2, which is the base of the calculation of the straight line L, correspond to each other. The correspondence determining section 31*e* can exclude, from a target of the determination, an area on the opposite side of the protrusion-shaped portion D2*b* with respect to the center of gravity M of the image 53 on the straight line L.

Figure 8:
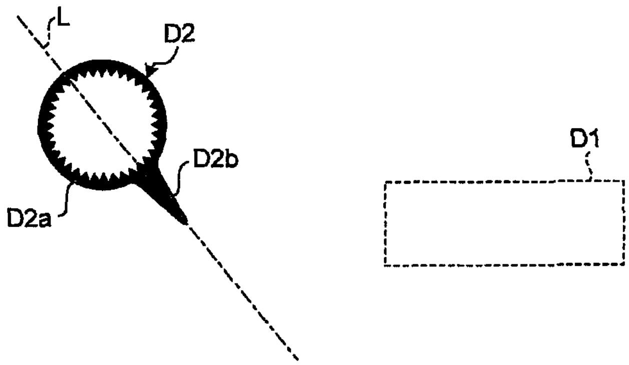
FIG. 8 is a diagram for explaining an example of determination concerning correspondence between the information code and the additional information, wherein it is determined that the information code and the additional information do not correspond to each other.
Figure 9:
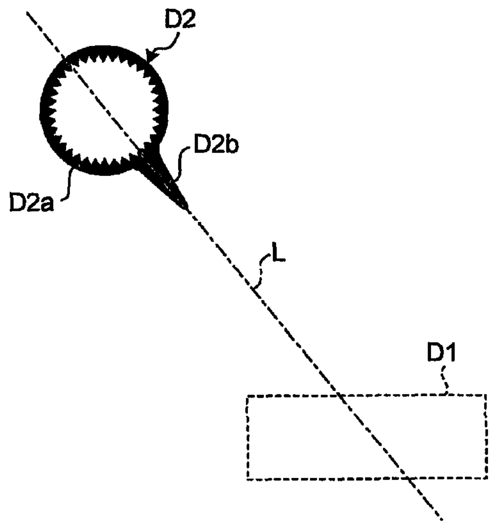
FIG. 9 is a diagram for explaining another example of determination concerning correspondence between the information code and the additional information, wherein it is determined that the information code and the additional information correspond to each other.

In step S7, if the first image data D1 is present on the straight line L or within a fixed distance from the straight line L as shown in FIGS. 7 and 9, the correspondence determining section 31*e* determines that the first image data D1 and the second image data D2 correspond to each other. On the other hand, if the first image data D1 is not present on the straight line L or within the fixed distance from the straight line L as shown in FIG. 8, the correspondence determining section 31*e* determines that the first image data D1 and the second image data D2 do not correspond to each other.

In some case, as shown in FIG. 7, the first image data D1 and the second image data D2 partially overlap each other. Therefore, the correspondence determining section 31*e* can distinguish the two image data D1 and D2 by performing image reduction processing or the like before performing the correspondence determination. Since the margin area g is provided as shown in FIG. 4, even if the pasted object 52 is pasted on the information code 51, the margin area g makes it possible to distinguish and recognize the two image data D1 and D2.

If the second image data D2 cannot be extracted in step S5 (No in step S6) and if it is determined in step S7 that the first image data D1 and the second image data D2 do not correspond to each other (No in step S8), the CPU 31 operates as the information-code specifying section 31*f* and executes reading of the information code 51 corresponding to the first image data D1 (step S11).

On the other hand, if it is determined in step S7 that the first image data D1 and the second image data D2 correspond to each other (Yes in step S8), the CPU 31 stores information indicating that the first image data D1 and the second image data D2 correspond to each other in the storage device 33*h* to thereby associate the first image data D1 and the second image data D2 (step S9). The CPU 31 operates as the additional-information specifying section 31*g* and specifies the additional information 54 corresponding to the second image data D2 (step S10). The CPU 31 operates as the information-code specifying section 31*f* and specifies the information code 51 corresponding to the first image data D1 (step S11). In step S10, the CPU 31 executes OCR (Optical Character Recognition) and obtains contents of the additional information 54.

The CPU 31 operates as the sales registration section 31*h* and the settlement section 31*i* and adds and registers the read information code 51 in the storage device 33*h*. After registration processing for all commodities 50 is completed, the CPU 31 executes settlement (settlement by cash, electronic money, a credit card, or the like) processing. In the registration processing, the CPU 31 reflects contents (price-cut, point grant, etc.) of the additional information 54 corresponding to the information code 51.

As explained above, in this embodiment, the pasted object 52 of the commodity 50 indicating the additional information 54 has the image 53. Therefore, as an example, in the image processing for the photographed image data in the CPU 31, a direction in which (the image data or the first image data corresponding to) the information code 51 related to (the image data or the second image data corresponding to) the pasted object 52 is present with respect to (the image data or the second image data corresponding to) the pasted object 52 on the coordinate is easily recognized. Therefore, as an example, in the image processing, the association between the information code 51 and the additional information 54 is more accurately or more easily grasped. Since the image 53 including the extending portion 53*b* is displayed on the pasted object 52, there is also an advantage that an operator who pastes the pasted object 52 to the commodity 50 can easily determine a pasting position of the pasted object 52 with respect to the information code 51 using the extending portion 53*b*.

A direction in which the information code 51 corresponding to the image 53 is present with respect to the image 53 is a direction along the straight line L obtained by the regression analysis (e.g., least square approximation) for the image data of the image 53. Therefore, as an example, in the image processing, the association between the information code 51 and the additional information 54 is more accurately or more easily grasped on the basis of a shape characteristic of the image data of the image 53.

In this embodiment, the image 53 is formed in a substantially line-symmetrical shape. In this embodiment, the image 53 includes the extending portion 53*b*. Therefore, as an example, in the image processing, the straight line L is easily obtained from the image data of the image 53. Therefore, as an example, the association between the information code 51 and the additional information 54 is more accurately or more easily grasped. As an example, in the image processing, the straight line L used in discrimination of the association between the additional information 54 and the information code 51 is easily specified. Therefore, as an example, in the image processing, the association between the information code 51 and the additional information 54 is still more accurately or still more easily grasped.

In this embodiment, the width of the extending portion 53*b* decreases toward one direction. In this embodiment, the extending portion 53*b* includes the pointed end 53*c*. Therefore, as an example, one side (as an example, a narrow side) of the straight line L can be validated and the other side (as an example, a wide side) of the straight line L can be invalidated according to a change in the width. Therefore, the association between the information code 51 and the additional information 54 is more accurately or more easily grasped.

In this embodiment, in the pasted object 52, the margin area g is provided around at least a part of the image 53. Therefore, in the image processing, the image 53 and the information code 51 are easily separated. Therefore, as an example, the association between the information code 51 and the additional information 54 is more accurately or more easily grasped in the image processing.

In this embodiment, the image 53 includes the surrounding portion 53*a* that surrounds the additional information 54. Therefore, as an example, in the image processing, an area of the additional information 54 is easily specified.

The preferred embodiment of the present invention is explained above. However, the present invention is not limited to the embodiment and various modifications of the embodiment are possible.

Figure 10:
FIG. 10 is a diagram of a modification of a pasted object used in the information reading apparatus.
Figure 11:
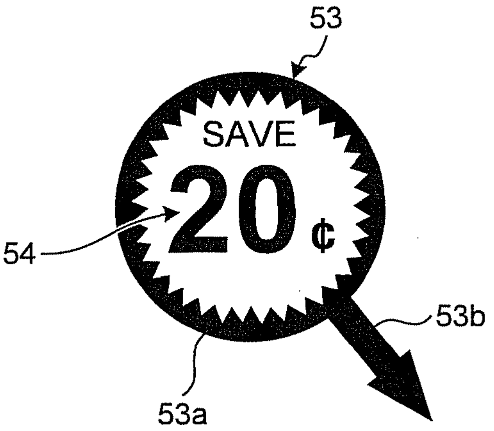
FIG. 11 is a diagram of a modification of the pasted object.

For example, the extending portion 53*b* of the image 53 is not limited to the embodiment. For example, as shown in FIG. 10, the extending portion 53*b* may be a linear image without a change in width. As shown in FIG. 11, the extending portion 53*b* may be an arrow-shaped image.

Figure 12:
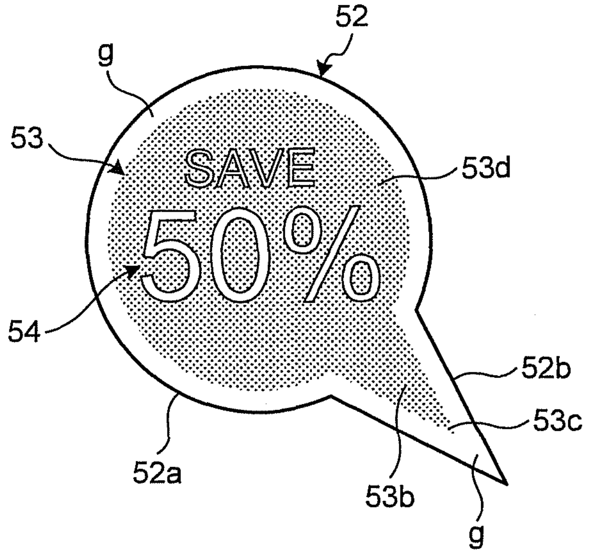
FIG. 12 is a diagram of a modification of the pasted object.

As shown in FIG. 12, the image 53 can include a background portion 53*d* serving as a partial background of the additional information 54 and the extending portion 53*b*. The image 53 can include both the surrounding portion 53*a* and the background portion 53*d*.

Figure 13:
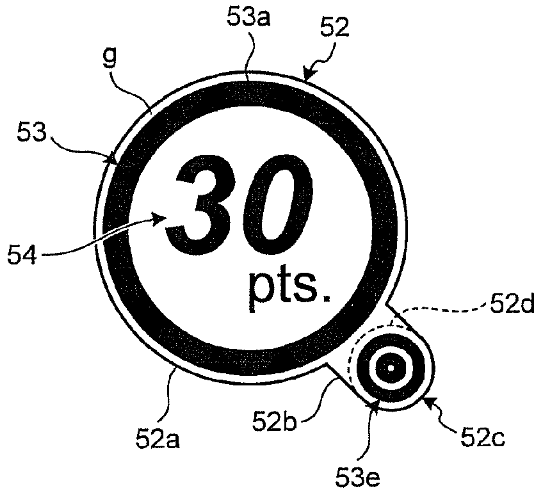
FIG. 13 is a diagram of a modification of the pasted object.
Figure 14:
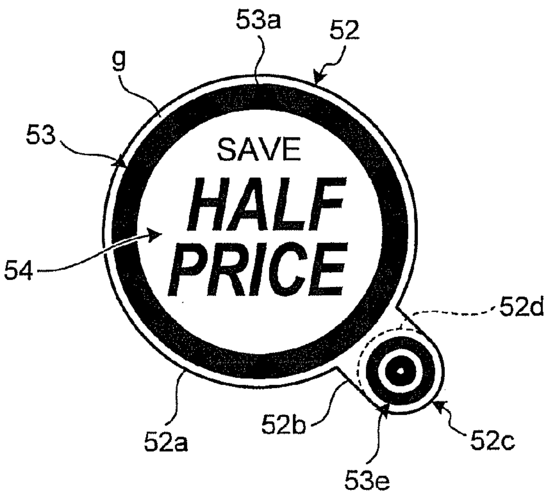
FIG. 14 is a diagram of a modification of the pasted object.
Figure 15:
FIG. 15 is a diagram of a modification of the pasted object.

As indicated by modifications shown in FIGS. 13 to 15, the image 53 can include a mark 53*e*. In these modifications, as an example, the mark 53*e* is arranged apart from the surrounding portion 53*a* and formed as a multiple circle (in this example, a double circle). However, FIGS. 13 to 16 are only examples. The mark 53*e* can be formed in an arbitrary predetermined shape (e.g., a star shape, a square shape, a triangular shape, a rectangular ring shape, or a rectangular multiple ring shape). In the case of these modifications, as in the embodiment, in the image processing, a direction in which the association of the information code 51 is validated with respect to the image 53 can be obtained from image data of the surrounding portion 53*a* and image data of the mark 53*e*. As an example, concerning data of pixels included in the image data of the surrounding portion 53*a* and the mark 53*e* (e.g., among binarized data of "0" or "1" of the pixels, data of "1" corresponding to the image), the straight line L on which a total of distances on the coordinate from the pixels included in the image 53 is minimized can be calculated by the regression analysis (e.g., least square approximation) and a direction indicated by the image 53 can be detected. A portion 52*c* affixed with the mark 53*e* can be separated from the projecting portion 52*b* along a cutting line (a perforation line) 52*d*. The mark 53*e* can represent that the pasted object 52 is pasted. Therefore, a person (an operator, a customer, etc.) or an information reading apparatus (the POS terminal 3, etc.) can easily discriminate necessity of processing (price-cut operation, the image processing, the arithmetic processing, etc.) according to the presence or absence of the mark 53*e*. If the portion 52*c* affixed with the mark 53*e* is separated from the pasted object 52 along the cutting line 52*d*, in the pasted object 52, the base portion 52*a* serving as a portion including the additional information 54 and the portion 52*c* affixed with the mark 53*e* can be arranged apart from each other. Therefore, a degree of freedom of a pasting position of a portion including the additional information 54 in the commodity 50 is easily increased.

Specifications (systems, structures, shapes, sizes, arrangements, positions, numbers, the numbers of pixels, etc.) of the components (the information reading apparatus, the commodity sales processing system, the commodity information processing apparatus, the POS terminal, the image pickup section, the commodity, the information code, the information, the pasted object, the image, the direction presenting image, etc.) can be changed and carried out as appropriate.

With the information reading apparatus according to the embodiment, it is possible to more accurately grasp the association between information code and information concerning a commodity displayed on a pasted object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information reading apparatus comprising:

a first image-data specifying section configured to specify, from photographed image data, first image data corresponding to an information code given to a commodity;

a second image-data specifying section configured to specify, from the photographed image data, second image data corresponding to a pasted object on which information and an image are displayed, the pasted object being pasted to the commodity;

a correspondence determining section configured to determine that the first image data and the second image data correspond to each other when the first image data is located, with respect to the second image data, in a direction specified on the basis of the second image data;

an information-code specifying section configured to specify the information code from the first image data; and an information specifying section configured to specify the information from the second image data, wherein the image includes an extending portion extending along one direction, and a width of the extending portion decreases toward the one direction.

2. An information reading apparatus comprising:

a first image-data specifying section configured to specify, from photographed image data, first image data corresponding to an information code given to a commodity;

a second image-data specifying section configured to specify, from the photographed image data, second image data corresponding to a pasted object on which information and an image are displayed, the pasted object being pasted to the commodity;

a correspondence determining section configured to determine that the first image data and the second image data correspond to each other when the first image data is located, with respect to the second image data, in a direction specified on the basis of the second image data;

an information-code specifying section configured to specify the information code from the first image data; and an information specifying section configured to specify the information from the second image data, wherein the image includes an extending portion extending along one direction, and a width of the extending portion decreases toward the one direction, wherein the extending portion includes a pointed end.

3. An information reading apparatus comprising:

a first image-data specifying section configured to specify, from photographed image data, first image data corresponding to an information code given to a commodity;

a second image-data specifying section configured to specify, from the photographed image data, second image data corresponding to a pasted object on which information and an image are displayed, the pasted object being pasted to the commodity;

a correspondence determining section configured to determine that the first image data and the second image data correspond to each other when the first image data is located, with respect to the second image data, in a direction specified on the basis of the second image data;

an information-code specifying section configured to specify the information code from the first image data; and an information specifying section configured to specify the information from the second image data, wherein the image includes an extending portion extending along one direction, and a width of the extending portion decreases toward the one direction, wherein the image includes a surrounding portion that surrounds the information.

4. An information reading apparatus comprising:

a first image-data specifying section configured to specify, from photographed image data, first image data corresponding to an information code given to a commodity;

a second image-data specifying section configured to specify, from the photographed image data, second image data corresponding to a pasted object on which information and an image are displayed, the pasted object being pasted to the commodity;

a correspondence determining section configured to determine that the first image data and the second image data correspond to each other when the first image data is located, with respect to the second image data, in a direction specified on the basis of the second image data;

an information-code specifying section configured to specify the information code from the first image data; and an information specifying section configured to specify the information from the second image data, wherein the image includes an extending portion extending along one direction, and a width of the extending portion decreases toward the one direction, wherein, in the pasted object, a margin area is provided around at least a part of the image.

5. An information reading apparatus comprising:

a first image-data specifying section configured to specify, from photographed image data, first image data corresponding to an information code given to a commodity;

a second image-data specifying section configured to specify, from the photographed image data, second image data corresponding to a pasted object on which information and an image are displayed, the pasted object being pasted to the commodity;

a correspondence determining section configured to determine that the first image data and the second image data correspond to each other when the first image data is located, with respect to the second image data, in a direction specified on the basis of the second image data;

an information-code specifying section configured to specify the information code from the first image data; and an information specifying section configured to specify the information from the second image data, wherein the image includes an extending portion extending along one direction, and a width of the extending portion decreases toward the one direction, wherein the image includes a background portion serving as a background of the information.

6. An information reading apparatus comprising:

a first image-data specifying section configured to specify, from photographed image data, first image data corresponding to an information code given to a commodity;

a second image-data specifying section configured to specify, from the photographed image data, second image data corresponding to a pasted object on which information and an image are displayed, the pasted object being pasted to the commodity;

a correspondence determining section configured to determine that the first image data and the second image data correspond to each other when the first image data is located, with respect to the second image data, in a direction specified on the basis of the second image data;

an information-code specifying section configured to specify the information code from the first image data; and an information specifying section configured to specify the information from the second image data, wherein the image includes an extending portion extending along one direction, and a width of the extending portion decreases toward the one direction, wherein the information specifying section does not specify the information from the second image data when the correspondence determining section does not determine that the first image data and the second image data correspond to each other.

7. An information reading apparatus comprising:

a first image-data specifying section configured to specify, from photographed image data, first image data corresponding to an information code given to a commodity;

a second image-data specifying section configured to specify, from the photographed image data, second image data corresponding to a pasted object on which information and an image are displayed, the pasted object being pasted to the commodity;

a correspondence determining section configured to determine that the first image data and the second image data correspond to each other when the first image data is located, with respect to the second image data, in a direction specified on the basis of the second image data;

an information-code specifying section configured to specify the information code from the first image data; and an information specifying section configured to specify the information from the second image data, wherein the image includes an extending portion extending along one direction, and the extending portion is formed in an arrow shape.

8. An information reading apparatus comprising:

a first image-data specifying section configured to specify, from photographed image data, first image data corresponding to an information code given to a commodity;

a second image-data specifying section configured to specify, from the photographed image data, second image data corresponding to a pasted object on which information and an image are displayed, the pasted object being pasted to the commodity;

a correspondence determining section configured to determine that the first image data and the second image data correspond to each other when the first image data is located, with respect to the second image data, in a direction specified on the basis of the second image data;

an information-code specifying section configured to specify the information code from the first image data; and an information specifying section configured to specify the information from the second image data, wherein the image includes an extending portion extending along one direction, and the extending portion is formed in an arrow shape, wherein the image includes a surrounding portion that surrounds the information.

9. An information reading apparatus comprising:

a first image-data specifying section configured to specify, from photographed image data, first image data corresponding to an information code given to a commodity;

a second image-data specifying section configured to specify, from the photographed image data, second image data corresponding to a pasted object on which information and an image are displayed, the pasted object being pasted to the commodity;

a correspondence determining section configured to determine that the first image data and the second image data correspond to each other when the first image data is located, with respect to the second image data, in a direction specified on the basis of the second image data;

an information-code specifying section configured to specify the information code from the first image data; and an information specifying section configured to specify the information from the second image data, wherein the image includes an extending portion extending along one direction, and the extending portion is formed in an arrow shape, wherein, in the pasted object, a margin area is provided around at least a part of the image.

10. An information reading apparatus comprising:

a first image-data specifying section configured to specify, from photographed image data, first image data corresponding to an information code given to a commodity;

a second image-data specifying section configured to specify, from the photographed image data, second image data corresponding to a pasted object on which information and an image are displayed, the pasted object being pasted to the commodity;

a correspondence determining section configured to determine that the first image data and the second image data correspond to each other when the first image data is located, with respect to the second image data, in a direction specified on the basis of the second image data;

an information-code specifying section configured to specify the information code from the first image data; and an information specifying section configured to specify the information from the second image data, wherein the image includes an extending portion extending along one direction, and the extending portion is formed in an arrow shape, wherein the image includes a background portion serving as a background of the information.

11. An information reading apparatus comprising:

a first image-data specifying section configured to specify, from photographed image data, first image data corresponding to an information code given to a commodity;

a second image-data specifying section configured to specify, from the photographed image data, second image data corresponding to a pasted object on which information and an image are displayed, the pasted object being pasted to the commodity;

a correspondence determining section configured to determine that the first image data and the second image data correspond to each other when the first image data is located, with respect to the second image data, in a direction specified on the basis of the second image data;

an information-code specifying section configured to specify the information code from the first image data; and an information specifying section configured to specify the information from the second image data, wherein the image includes an extending portion extending along one direction, and the extending portion is formed in an arrow shape, wherein the information specifying section does not specify the information from the second image data when the correspondence determining section does not determine that the first image data and the second image data correspond to each other.

* * * * *